United States Patent
Sun et al.

(10) Patent No.: US 10,079,628 B2
(45) Date of Patent: Sep. 18, 2018

(54) SIGNALING RESOURCE ALLOCATIONS IN MULTI-USER DATA UNITS

(71) Applicant: MARVELL WORLD TRADE LTD., St. Michael (BB)

(72) Inventors: Yakun Sun, Sunnyvale, CA (US); Hongyuan Zhang, Fremont, CA (US); Liwen Chu, San Ramon, CA (US); Lei Wang, San Diego, CA (US); Jinjing Jiang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 85 days.

(21) Appl. No.: 15/167,643

(22) Filed: May 27, 2016

(65) Prior Publication Data

US 2016/0353323 A1 Dec. 1, 2016

Related U.S. Application Data

(60) Provisional application No. 62/166,856, filed on May 27, 2015.

(51) Int. Cl.
*H04B 7/0456* (2017.01)
*H04W 84/12* (2009.01)
(Continued)

(52) U.S. Cl.
CPC ......... *H04B 7/0456* (2013.01); *H04L 5/0053* (2013.01); *H04L 5/0092* (2013.01);
(Continued)

(58) Field of Classification Search
CPC .. H04W 28/065; H04W 84/12; H04B 7/0456; H04L 5/0053; H04L 5/0092; H04L 5/0037
See application file for complete search history.

(56) References Cited

U.S. PATENT DOCUMENTS

| 8,144,647 B2 | 3/2012 | Nabar et al. |
| 8,149,811 B2 | 4/2012 | Nabar et al. |

(Continued)

FOREIGN PATENT DOCUMENTS

| WO | WO-2012/162576 | 11/2012 |
| WO | WO-2015/070230 | 5/2015 |

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers*, Inc., pp. 1-456 (Sep. 2013).

(Continued)

*Primary Examiner* — Brian D Nguyen

(57) ABSTRACT

A physical layer (PHY) preamble of a multi-user (MU) PHY data unit is generated. The PHY preamble is generated to include formatting information regarding the MU PHY data unit, including a field to be transmitted within a first individual communication channel among a plurality of individual communication channels that collectively span a bandwidth of a composite channel, each individual communication channel including a plurality of basic resource allocation (RA) units that collectively span a bandwidth of the individual communication channel. The field is generated to indicate one or more groupings of basic RA units, wherein at least one of the one or more groupings of basic RA which includes basic RA units of one or more other individual communication channels. A data portion of the MU PHY data unit is generated according to the formatting information in the PHY preamble, and the MU PHY data unit is generated to include the PHY preamble and the data portion.

18 Claims, 9 Drawing Sheets

(51) Int. Cl.
*H04W 72/04* (2009.01)
*H04L 5/00* (2006.01)

(52) U.S. Cl.
CPC ..... *H04W 72/042* (2013.01); *H04W 72/0453* (2013.01); *H04W 84/12* (2013.01); *H04L 5/0037* (2013.01)

(56) References Cited

U.S. PATENT DOCUMENTS

| | | | |
|---|---|---|---|
| 8,270,909 | B2 | 9/2012 | Zhang et al. |
| 8,363,578 | B1 | 1/2013 | Ramamurthy et al. |
| 8,472,383 | B1 | 6/2013 | Banerjea et al. |
| 8,526,351 | B2 | 9/2013 | Fischer et al. |
| 8,599,803 | B1 | 12/2013 | Zhang et al. |
| 8,660,497 | B1 | 2/2014 | Zhang et al. |
| 8,670,399 | B2 | 3/2014 | Liu et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,886,755 | B1 | 11/2014 | Liu et al. |
| 8,923,118 | B1 | 12/2014 | Liu et al. |
| 8,971,350 | B1 | 3/2015 | Liu |
| 9,166,660 | B2 | 10/2015 | Chu et al. |
| 9,215,055 | B2 | 12/2015 | Chu et al. |
| 2008/0075058 | A1 | 3/2008 | Mundarath et al. |
| 2008/0117867 | A1 | 5/2008 | Yin et al. |
| 2009/0196163 | A1 | 8/2009 | Du |
| 2010/0260159 | A1 | 10/2010 | Zhang et al. |
| 2011/0002219 | A1 | 1/2011 | Kim et al. |
| 2011/0038332 | A1 | 2/2011 | Liu et al. |
| 2011/0096796 | A1 | 4/2011 | Zhang et al. |
| 2011/0096797 | A1 | 4/2011 | Zhang et al. |
| 2011/0128929 | A1 | 6/2011 | Liu et al. |
| 2011/0128947 | A1 | 6/2011 | Liu et al. |
| 2011/0194475 | A1 | 8/2011 | Kim et al. |
| 2011/0255620 | A1 | 10/2011 | Jones, IV et al. |
| 2011/0310827 | A1 | 12/2011 | Srinivasa et al. |
| 2012/0082263 | A1* | 4/2012 | Mahalleh ............ H04B 7/0669 375/299 |
| 2013/0229996 | A1 | 9/2013 | Wang et al. |
| 2013/0259017 | A1 | 10/2013 | Zhang et al. |
| 2013/0286959 | A1 | 10/2013 | Lou et al. |
| 2014/0307612 | A1 | 10/2014 | Vermani et al. |
| 2015/0023335 | A1* | 1/2015 | Vermani .............. H04B 7/0452 370/338 |
| 2015/0063255 | A1 | 3/2015 | Tandra et al. |
| 2015/0131517 | A1 | 5/2015 | Chu et al. |
| 2015/0146653 | A1 | 5/2015 | Zhang et al. |
| 2015/0146807 | A1 | 5/2015 | Zhang et al. |
| 2016/0066324 | A1* | 3/2016 | Li ........................ H04L 69/22 370/338 |
| 2016/0072564 | A1* | 3/2016 | Li ........................ H04L 5/0025 370/329 |
| 2016/0100381 | A1* | 4/2016 | Li ........................ H04L 5/0023 370/329 |
| 2016/0112851 | A1* | 4/2016 | Li ........................ H04L 69/18 370/338 |
| 2016/0156438 | A1 | 6/2016 | Sun et al. |
| 2016/0242149 | A1* | 8/2016 | Batra .................. H04J 13/16 |
| 2016/0285596 | A1* | 9/2016 | Park .................... H04L 5/003 |
| 2016/0285600 | A1 | 9/2016 | Sun et al. |

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.16™-2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers*, Inc., 2558 pages (Aug. 17, 2012).

International Search Report and Written Opinion in International Patent Application No. PCT/US2016/034827, dated Aug. 10, 2016 (13 pages).

Cariou et al., "Multi-channel Transmissions," Doc. No. IEEE 802. 11-09/1022r0, *The Institute of Electrical and Electronics Engineers, Inc.*, pp. 1-13 (Sep. 2009).

Chen, "Home Network Basis: Transmission Environments and Wired/Wireless Protocols," Prentice Hall, pp. 1-26 (Jul. 2003).

Hiertz et al., "The IEEE 802.11 Universe," IEEE Communications Magazine, pp. 62-70, (Jan. 2010).

Kwon et al., "SIG Field Design Pricniple for 11ax," Institute for Electrical and Electronics Engineers, draft, 802.11-15/0344r2, 18 pages (Mar. 9, 2015).

Lin et al., "Optimal and Near-Optimal Resource allocation Algorithms for OFDMA Networks," *IEEE Transactions on Wireless Communications*, vol. 8, No. 8, pp. 4066-4077 (Aug. 2009).

Liu et al., "VHT BSS Channel Selection," *Institute of Electrical and Electronics Engineers, Inc.*, doc. No. IEEE 802.11-11/1433r0, pp. 1-10 (Nov. 2011).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Noh et al., "Channel Selection and Management for 11ac," Doc. No. IEEE 802.11-10/059311 , *The Institute of Electrical and Electronics Engineers, Inc.*, pp. 1-21 (May 20, 2010).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Redieteab et al., "Cross-Layer Multichannel Aggregation for Future WLAN Systems," 2010 IEEE Int'l Conf. on Communication Systems (ICCS), pp. 740-756 (Nov. 2010).

Seok et al., "HEW PPDU Format for Supporting MIMO-OFDMA," IEEE 802.11-14/1210r0, 16 pages, (Sep. 14, 2014).

Shahrnaz et al. "OFDMA Numerology and Structure," IEEE 802. 11-15/0330r1 (Mar. 9, 2015—38 pages.

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Stacey, "Specification Framework for TGax," Doc. No. IEEE 802. 11-15-/0132r8, IEEE P802.11 Wireless LANs, Institute for Electrical and Electronics Engineers, 22 pages (Sep. 22, 2015).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

van Nee et al. "The 802.11n MIMO-OFDM Standard for Wireless LAN and Beyond," Wireless Personal Communications, vol. 37, pp. 445-453 (Jun. 2006).

(56) References Cited

OTHER PUBLICATIONS

Wannstrom, "Carrier Aggregation explained," pp. 1-6 (May 2012).
Yuan et al., "Carrier Aggregation for LTE-Advanced Mobile Communication Systems," IEEE Communications Magazine, pp. 88-93 (Feb. 2010).
U.S. Appl. No. 12/730,651, Zhang, et al, "OFDMA with Block Tone Assignment for WLAN," filed Mar. 24, 2010.
U.S. Appl. No. 14/707,898, Sun et al., "Tone Block Allocation for Orthogonal Frequency Division Multiple Access Data Unit," filed May 8, 2015.
International Preliminary Report on Patentability in International Patent Application No. PCT/US2016/034827, dated Dec. 7, 2017 (8 pages).

* cited by examiner

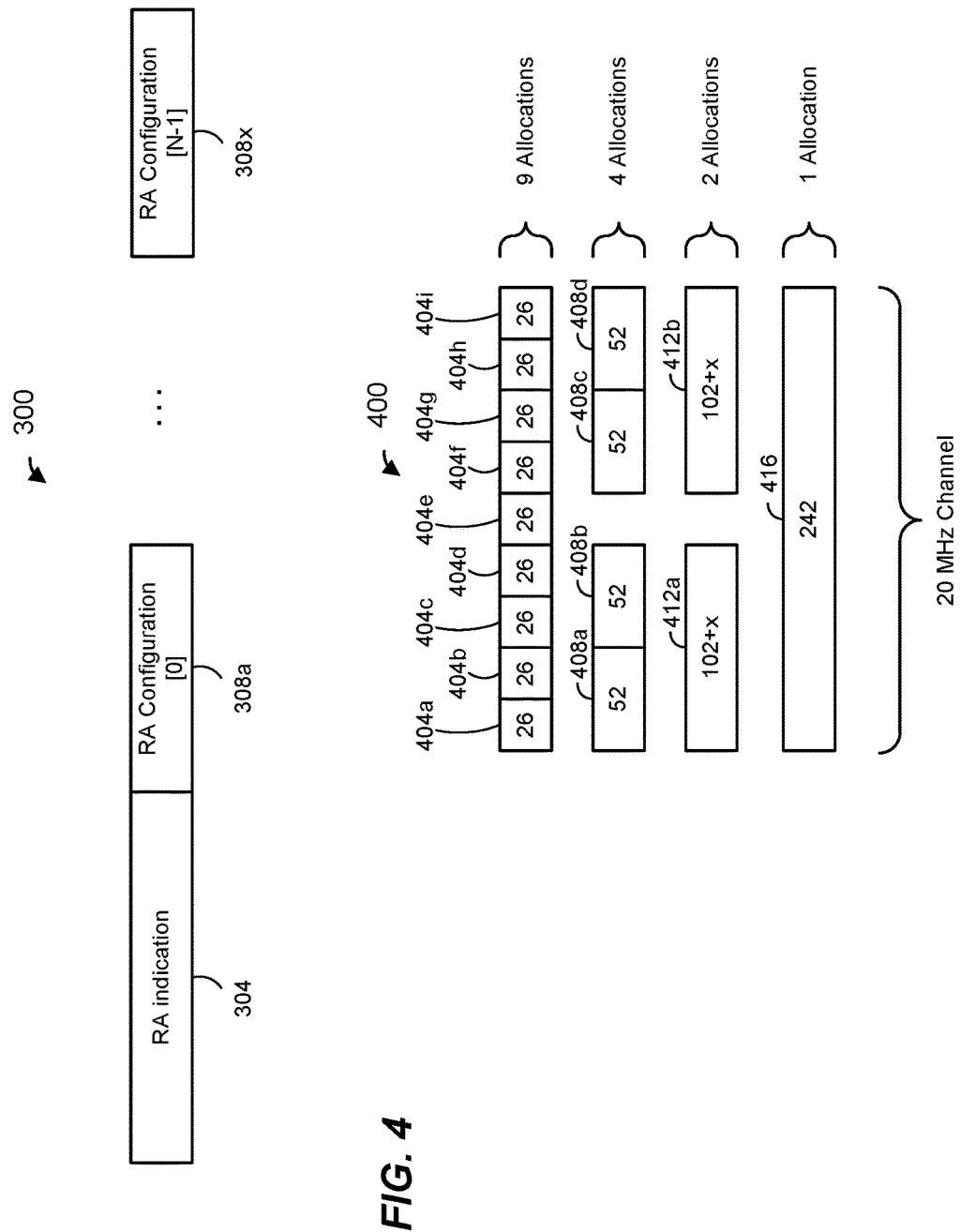

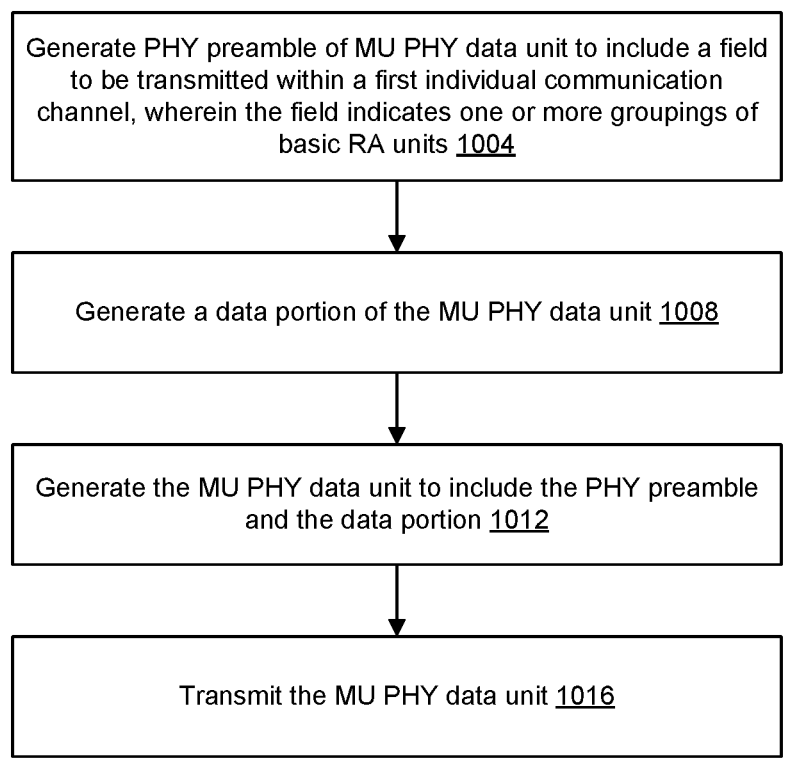

SIGNALING RESOURCE ALLOCATIONS IN MULTI-USER DATA UNITS

CROSS-REFERENCES TO RELATED APPLICATIONS

This disclosure claims the benefit of U.S. Provisional Patent Application No. 62/166,856, entitled "Individual OFDMA Resource Allocation Signaling for WiFi," filed on May 27, 2015, the disclosure of which is hereby incorporated by reference herein in its entirety.

FIELD OF THE DISCLOSURE

The present disclosure relates generally to communication networks and, more particularly, to wireless local area networks (WLANs) that utilize orthogonal frequency division multiple access (OFDMA) technology.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method corresponds to generating multi-user (MU) physical layer (PHY) data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel. The method includes: generating, at a communication device, a PHY preamble that includes formatting information regarding the MU PHY data unit, including generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels; generating, at the communication device, a data portion of the MU PHY data unit according to the formatting information in the PHY preamble; and generating, at the communication device, the MU PHY data unit to include the PHY preamble and the data portion.

In another embodiment, an apparatus comprises: a network interface device having one or more integrated circuits configured to generate a PHY preamble of an MU PHY data unit for transmission via a composite communication channel that comprises a plurality of individual communication channels that collectively span a bandwidth of the composite communication channel, wherein each individual communication channel includes a plurality of basic RA units that collectively span a bandwidth of the individual communication channel. The PHY preamble is generated to include formatting information regarding the MU PHY data unit, including: generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels. The one or more integrated circuits are further configured to: generate a data portion of the MU PHY data unit according to the formatting information in the PHY preamble, and generate the MU PHY data unit to include the PHY preamble and the data portion.

BRIEF DESCRIPTION OF THE DRAWINGS

FIG. 3 is a diagram of an example resource allocation information element in a PHY preamble, according to an embodiment.

FIG. 4 is a diagram of an example resource allocation scheme used for allocation of resources for a 20 MHz-wide individual communication channel, according to an embodiment.

FIG. 10 is a flow diagram of an example method for generating an MU PHY data unit, according to an embodiment.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client station and uplink direction from one or more client stations to the AP. In an embodiment, the first communication protocol supports one or more multi-user (MU) modes in which the AP transmits multiple independent data streams simultaneously to multiple client stations, or receives independent data streams simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations, and/or using orthogonal frequency division multiple access (OFDMA) transmission in which respective frequency sub-channels of a communication channel are used for simultaneous transmission to, or by, respective ones of multiple client stations, in various embodiments.

In various embodiments, a data unit transmitted in the downlink direction from the AP to one or more client stations 25 ("DL data unit"), includes in a physical layer (PHY) preamble one or more fields that include formatting information needed at the receiving device(s) to properly receive and decode the DL data unit. For example, for a DL MU data unit utilizing OFDMA, the PHY preamble includes one or more fields that include information indicating how frequency resources in a PHY data portion of the data unit have been allocated among multiple receiving devices, according to some embodiments. The multiple receiving devices then use such information in the PHY preamble to decode information in the PHY payload of the DL OFDMA data unit at appropriate frequency portions.

Figure 1:
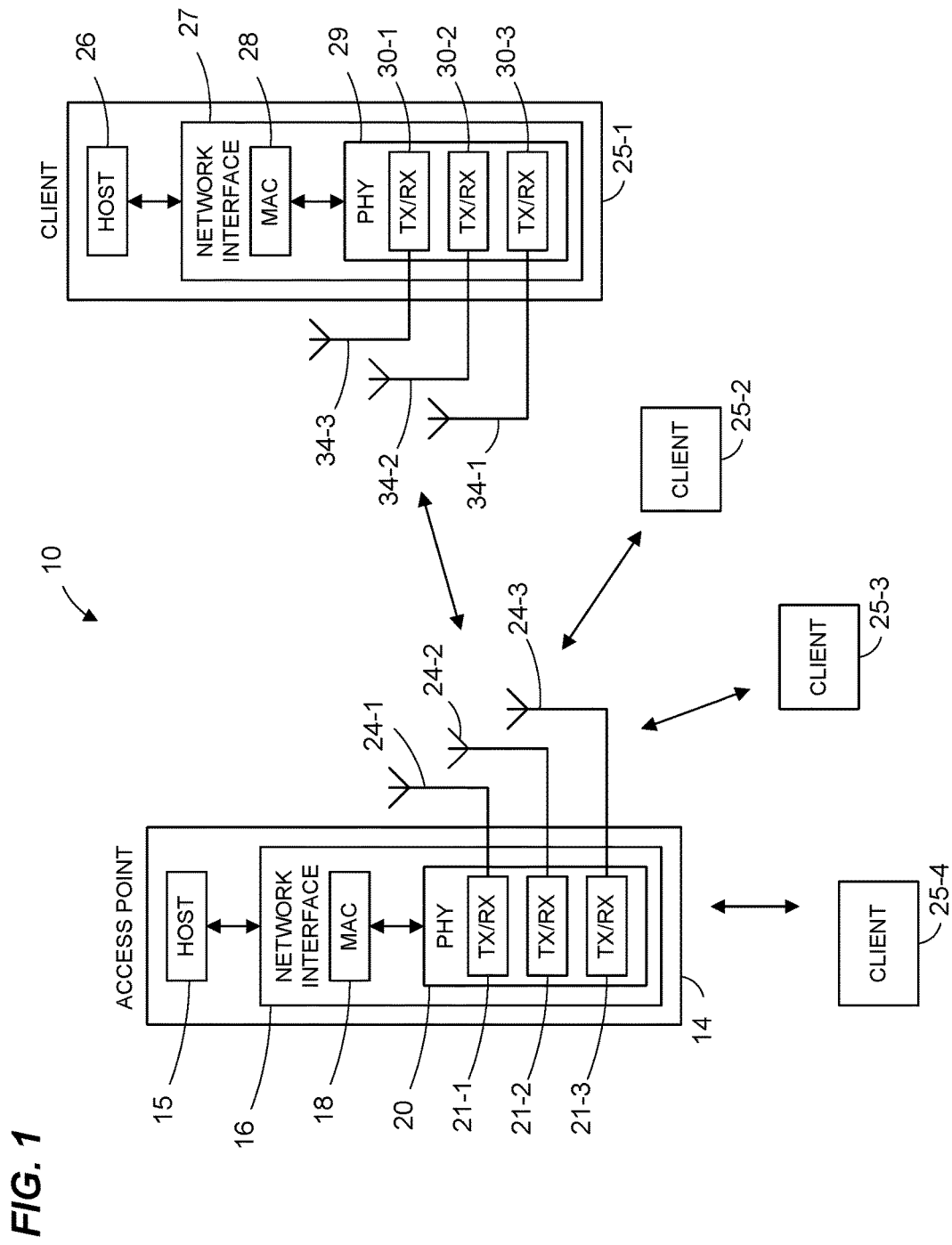
FIG. 1 is a block diagram of an example wireless local area network (WLAN) in which methods and apparatuses described herein are utilized, according to an embodiment.

FIG. 1 is a block diagram of an example wireless local area network (WLAN) 10 in which techniques described below are utilized, according to an embodiment. The WLAN 10 supports downlink (DL) and/or uplink (UL) OFDMA communication between an access point (AP) and a plurality of client stations, in some embodiments. The WLAN 10 also supports DL and/or uplink UL multiuser multiple-input and multiple-output (MU-MIMO) communication between the AP and a plurality of client stations, in some embodiments. Additionally, the WLAN 10 supports DL and UL single-user (SU) communication between the AP and each of a plurality of client stations, in some embodiments.

The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the MAC processing unit 18 and the PHY processing unit 20 are configured to operate according to the first communication protocol (e.g., HE communication protocol). In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In an embodiment, the MAC processing unit 28 and the PHY processing unit 29 are configured to operate according to the first communication protocol (e.g., HE communication protocol). In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a second, legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2:
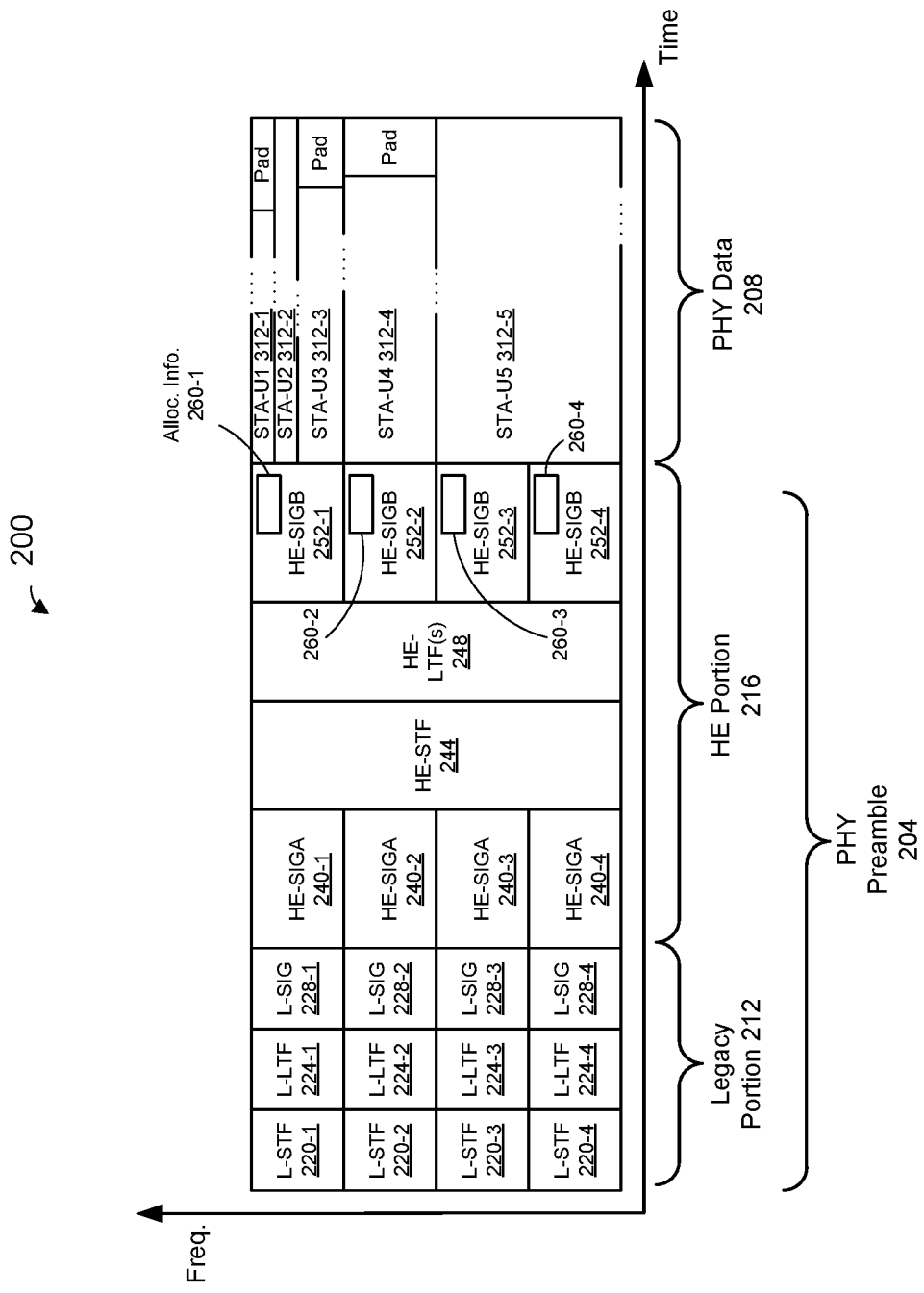
FIG. 2 is a diagram of an example multi-user (MU) physical layer (PHY) data unit, according an embodiment.

FIG. 2 is a diagram of a physical layer (PHY) data unit 200 that the AP 14 is configured to transmit to one or more client stations 25 (e.g., one or more of the client stations 25-1, 25-2, 25-3), according to an embodiment. The data unit 200 conforms to the HE communication protocol and occupies an 80 MHz bandwidth. Data units similar to the data unit 200 occupy other suitable bandwidth such as 20 MHz, 40 MHz, 120 MHz, 160 MHz, 320 MHz, 640 MHz, etc., for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Thus, the AP 14 generates and transmits the data unit 200, in some embodiments.

In an embodiment, available OFDM tones (e.g., OFDM tones that are not used as direct current (DC) tones and/or guard tones) are partitioned into multiple resource units (RUs), and each of the multiple RUs is allocated to one or more client stations 25 for transmission of data to the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, in an embodiment. In an embodiment, each allocated resource unit includes one or more K-OFDM basic resource units. As just an example, K=26, in an embodiment. According to this illustrative example, a basic resource unit includes 26 OFDM tones, in this embodiment.

A resource unit allocated to a client station 25, or allocated to multiple client stations 25, includes a number of OFDM tones that is an integer multiple of K (e.g., 26) OFDM tones, such as K*1 (e.g., 26) OFDM tones, K*2 (e.g., 52) OFDM tones, K*3 (e.g., 78) OFDM tones, etc., in an embodiment. In another embodiment, K is any suitable integer other than 26, and a basic resource unit includes a corresponding number of OFDM tones other than 26.

In some embodiments, the first protocol defines individual communication channels of a suitable bandwidth (e.g., 1 MHz, 5 MHz, 10 MHz, 20 MHz, etc.), and composite communication channels can be formed by aggregating or "bonding together" multiple individual channels. Thus, in the example of FIG. 2, the data unit 200 spans a composite communication channel comprising four individual communication channels, according to an embodiment. In other embodiments and/or scenarios, a composite communication channel can consist of different suitable numbers of individual communication channels, such as two, three, four, five, six, seven, etc. In one illustrative embodiment, the first communication protocol permits composite communication channels consisting of two, four, eight, or sixteen individual communication channels.

In an embodiment, each individual communication channel comprises a suitable number of basic resource units. In one illustrative embodiment, each individual communication channel spans a bandwidth of 20 MHz, and each individual communication channel comprises nine basic resource units, where each basic resource unit comprises 26 OFDM tones. In other embodiments, each individual communication channel includes a suitable number of basic resource units different than nine, such as two, three, four, five, etc.

The data unit 200 includes a PHY preamble 204 and a PHY data portion 208. The PHY preamble 204 includes a legacy portion 212 and an HE portion 216.

The legacy portion 212 includes a legacy short training field (L-STF) 220, a legacy long training field (L-LTF) 224, and a legacy signal field (L-SIG) 228. In an embodiment, each L-STF 220, L-LTF 224, and L-SIG 228 spans an individual communication channel and is duplicated in other individual communication channels. For example, in an embodiment, each L-STF 220, L-LTF 224, and L-SIG 228 spans an individual 20 MHz communication channel and is duplicated in other individual 20 MHz communication channels.

The HE portion 216 includes a first HE signal field (HE-SIGA) 240, an HE short training field (HE-STF) 244, one or more HE long training fields (HE-LTF(s)) 248, and a second HE signal field (HE-SIGB) 252. In an embodiment, each HE-SIG-A 240 spans an individual communication channel and is duplicated in other individual communication channels. For example, in an embodiment, each HE-SIGA 240 spans an individual 20 MHz communication channel and is duplicated in other individual 20 MHz communication channels. In other embodiments, respective HE-SIGAs 240 in respective individual channels are not duplicates but rather may include different information (e.g., different allocation information), as will be described in more detail below.

Each of the HE-STF 244 and the HE-LTF(s) 248 span the composite communication channel, in an embodiment. In an embodiment, respective HE-SIGBs 252 span respective individual communication channels similar to the HE-SIGAs 240. In some embodiments, at least one of the HE-SIGBs 252 includes different information than another HE-SIGB 252.

In embodiments in which the data unit 200 spans only a single individual channel, the data unit includes a single L-STF 220, a single L-LTF 224, a single L-SIG 228, single HE-SIGA 240, and a single HE-SIGB 252.

In some embodiments, the preamble 204 includes additional fields not illustrated in FIG. 2.

Each of the L-STF 220, the L-LTF 224, the L-SIG 228, the HE-SIG-A 240, the HE-STF 244, the HE-LTF(s) 248, and the HE-SIG-B 252, comprises one or more OFDM symbols. As merely an example, in an embodiment, the HE-SIG-A 240 comprises two OFDM symbols, and the HE-SIG-B 252 comprises one OFDM symbol. As merely another example, in another embodiment, the HE-SIG-A 240 comprises one OFDM symbol, the HE-SIG-B 252 comprises two OFDM symbols. As yet another example, in an embodiment, the HE-SIG-A 240 comprises two OFDM symbols, and the HE-SIG-B 252 comprises a variable number of OFDM symbols. In an embodiment in which the HE-SIG-B 252 comprises a variable number of OFDM symbols, the particular number of HE-SIG-B 252 OFDM symbols in the data unit 200 is indicated in the HE-SIG-A 240.

In some embodiments, the modulation of signals in different individual communication channels signals is rotated by different angles. For example, in one embodiment, all OFDM tones within a first individual communication channel are rotated 0-degrees, all OFDM tones within a second individual communication channel are rotated 90-degrees, a third individual communication channel is rotated 180-degrees, and a fourth individual communication channel is rotated 270-degrees. In other embodiments, different suitable rotations are utilized. The different phases of the individual communication channel signals result in reduced peak to average power ratio (PAPR) of OFDM symbols in the data unit 200, in at least some embodiments.

In an embodiment, each of the HE-SIG-A 240 and the HE-SIG-B 252 generally carries information about the format of the data unit 200, such as information needed to properly decode at least the data portion 208, in an embodiment. In an embodiment in which the data unit 200 is a multi-user data unit, HE-SIG-A 240 carries information commonly needed by multiple intended receivers of the data unit 200. In some embodiments, HE-SIG-A 240 additionally includes information for client stations 25 that are not intended receivers of the data unit 200, such as information needed for medium protection from the client stations 25 that are not receivers of the data unit 200.

In some embodiments, the HE-SIGA 340 includes general resource allocation information regarding the MU UL transmission 308 that is to follow, such any suitable combination of one or more of subchannel partition information, spatial channel partition information, an indicator of a format of station identifiers, etc. In various other embodiments, any of the general resource allocation information mentioned above are not included in the HE-SIGA 340, and/or other suitable general resource allocation information is included.

In some embodiments, the HE-SIGBs 252 includes resource allocation information regarding the PHY data portion 208, such as how basic resource units are allocated and which stations 25 correspond to which allocations. Resource allocation information included in the HE-SIGBs 252 are indicated in FIG. 2 as 260. In some embodiments, resource allocation information is additionally or alternatively included in HE-SIGAs 240.

FIG. 3 is a diagram of an information element 300 in which resource allocation information is included, according to an embodiment. In an embodiment, the information element 300 is an example of resource allocation information 260 in FIG. 2. The network interface 16 is configured to generate the HE-SIGBs 252 to include information elements such as the information element 300, in some embodiments.

The OFDMA information element 300 includes a plurality of subfields, including a resource allocation (RA) subfield 304 and a plurality of RA configuration subfields 308. In an embodiment, the resource allocation subfield 304 indicates a mapping between subcarrier blocks (e.g., basic resource units, as described above) and resource units in the data unit 200. For example, the RA subfield 304 includes a bitmap with bits corresponding to basic resource units in the data unit 200, wherein the respective bits indicate allocation of the basic resource units to particular resource units in the data unit 200. In another embodiment, the RA subfield 304 includes a codebook, other than a bitmap, that indicates a mapping between basic resource units and resource units. Each resource unit is allocated to transmission of data to a single client station 25, as is the case with a single user resource unit, or is allocated to transmission of data to a group of client stations 25 (e.g., an MU-MIMO transmission), as is the case with a multi-user resource unit, in an embodiment.

The RA configuration subfields 308 correspond to particular ones of the resource units, and indicate respective transmission parameters used for the corresponding ones of the resource units in the data unit 200, in an embodiment. Accordingly, the number of RA configuration subfields 308 in the OFDMA information element 300 corresponds to the number of allocated resource units in the data unit 200 as indicated by the RA subfield 304, in an embodiment. Each RA configuration subfield 308 includes transmission parameters used for a single client station 25 or used for respective client stations 25 in an MU-MIMO group of client stations 25, in an embodiment.

With continued reference to FIG. 3, in an embodiment, the RA subfield 304 includes a variable number of bits, wherein the particular number of bits in the RA subfield 304 depends on the bandwidth of the data unit 200. For example, more bits are used to indicate resource allocation in a data unit with a relatively wider bandwidth as compared to the number of bits used to indicate resource allocation in a data unit with a relatively narrower bandwidth, in an embodiment. In an embodiment, the RA configuration subfields 308 include variable numbers of bits, wherein the particular number of bits in an RA configuration subfield 308 depends, for example, on whether the RA configuration subfield 308 corresponds to a single user resource unit or a multiple user resource unit. In some embodiments, the RA subfield 304 indicates an allocation of basic resource units to one or more resource units, and each RA configuration subfield 308 indicates which station(s) correspond to which resource units. In some embodiments, the RA subfield 304 indicates both i) an allocation of basic resource units to one or more resource units, and ii) which station(s) correspond to which resource units.

Referring now to FIGS. 2 and 3, one or more information elements 300 are included in one or more HE-SIGBs 252, in some embodiments. For example, in an embodiment, each HE-SIGB 252 includes at least one information element 300. In some embodiments, a first information element 300 in a first HE-SIGB 252 includes different information than a second information element 300 in a second HE-SIGB 252. Additionally or alternatively, the first information element 300 in the first HE-SIGB 252 includes the same information as a third information element 300 in a third HE-SIGB 252, in some embodiments. Similarly, additionally or alternatively, the second information element 300 in the second HE-SIGB 252 includes the same information as a fourth information element 300 in a fourth HE-SIGB 252, in some embodiments.

FIG. 4 is a diagram of an example resource allocation scheme 400 used for allocation of resources for a 20 MHz-wide individual communication channel, according to an embodiment. The resource allocation scheme 400 is based on a tone plan that includes 242 data/pilot tones in the 20 MHz-wide communication channel, in an embodiment. The resource allocation scheme 400 is based on a tone plan that includes 242 data/pilot tones in the 20 MHz-wide communication channel, in an embodiment. The resource allocation scheme 400 allocates basic resource unit blocks 404 to resource units, wherein each resource unit comprises one or more of the basic resource unit blocks 404, in an embodiment. Each basic resource unit block 404 includes a respective subset of the 242 data/pilot tones, in an embodiment. For example, each basic resource unit 404 includes 26 consecutive data/pilot tones, in the illustrated embodiment. Accordingly, the tone plan 400 includes nine basic resource units 404, collectively spanning 234 OFDM tones, and eight leftover tones, in this embodiment. The eight leftover tones remain unused in the resource allocation scheme 400, according to an embodiment. In another embodiment, one or more of the leftover tones are combined with one or more of the resource units 404. In yet another embodiment, the leftover tones are unused in some situations, and are combined with one or more of the basic resource units 404 in other situations. For example, if all of the basic resource units 404 are allocated to a same resource unit, then the leftover tones are combined with the basic resource unit blocks 404 to form a 242-tone resource unit 416, in an embodiment. On the other hand, if the basic resource units 404 are allocated to multiple resource units, then the leftover tone remain unused, in an embodiment.

In an embodiment, basic resource units 404a and 404b can be allocated together as a resource unit 408a; basic resource units 404c and 404d can be allocated together as a resource unit 408b; basic resource units 404f and 404g can be allocated together as a resource unit 408c; and basic resource units 404h and 404i can be allocated together as a resource unit 408d. In an embodiment, basic resource units 404a-404d can be allocated together as a resource unit 412a; and basic resource units 404f-404i can be allocated together as a resource unit 412b. In an embodiment, all of the basic resource units 404a-404i can be allocated together as the 242-tone resource unit 416.

Referring now to FIGS. 3 and 4, in an embodiment, resource allocation indication 304 used with the resource allocation scheme 400 includes a bitmap, wherein each bit in the bitmap corresponds to a particular basic resource unit 404. Thus, for example, in the embodiment of FIG. 4, a resource allocation bitmap used with the RA plan 400 includes nine bits corresponding to the nine basic resource unit 404, in an embodiment. A set of one or more consecutive bits that have a same value (e.g., 0 or 1) indicate allocation of the corresponding basic resource to a same resource unit, in an embodiment. On the other hand, a change in value between two consecutive bits in the bitmap (e.g., from 1 to 0 or from 0 to 1) indicates that the corresponding basic resource units are allocated to different resource units, in an embodiment. Accordingly, a change in value between two consecutive bits indicates a beginning of a new resource unit, in this embodiment. Such bitmap also indicates the total number of resource units allocated, in an embodiment. As just an example the values of "110010100" of the resource allocation bitmap bits indicate that six resource units are allocated, and that the six resource units respectively include 2, 2, 1, 1, 1 and 2 basic resource units 404a, in an embodiment.

In an embodiment, if all of the basic resource units 404 are allocated to a single resource unit in the data unit 200, then the leftover tones are included in the tone allocated for the single unit. On the other hand, if the basic resource units 404 are respectively allocated to two or more resource units in the data unit 200, the leftover tones are not allocated to any of the resource units and are unused, in an embodiment. For example, in an embodiment, an indication that all of the basic resource units 404 are allocated to a same resource unit also indicates allocation of the leftover tones to the same resource unit. Thus, for example, the value of "111111111" in the resource allocation bitmap indicates that all 242 tones in the channel are allocated to the single resource unit 416, in an embodiment.

Although the resource units 404 are illustrated in FIG. 4 as each including 26 consecutive OFDM tones, the basic resource units 404 include other suitable numbers of OFDM tones and/or least some of the basic resource units 404 include at least some non-consecutive OFDM tones, in some embodiments. Similarly, although the allocation scheme 400 includes nine basic resource units 404, other suitable numbers of basic resource units are utilized in other embodiments. Additionally, although the example scheme 400 was discussed in the context of a communication channel spanning 20 MHz, the scheme 400, or other suitable schemes, can be utilized with communication channels having other suitable bandwidths. For example, a resource allocation scheme similar to the resource allocation scheme 400 is used with data units that occupy 40 MHz-wide, 80 MHz-wide, 160 MHz-wide, etc., communication channels, in some embodiments and/or scenarios. As a more specific example, in various embodiments and scenarios that utilize basic resource units having 26 data/pilot tones, a resource allocation scheme used with a 40 MHz communication channel includes 19 basic resource units, a 40 MHz communication channel includes 38 basic resource units, and a 160 MHz communication channel includes 76 basic resource units. Accordingly, bitmaps used to signal resource allocation include 19, 28 and 76 bits for signaling allocation in 40 MHz-wide, 80 MHz-wide and 160 MHz-wide channels, respectively, in an embodiment.

In other embodiments, a codebook or look up table, instead of a bit map, is utilized to indicate how basic resource units are allocated. For example, a codebook corresponds to a plurality of possible allocations, and a codebook entry is utilized to indicate which allocation is being utilized, in an embodiment. As another example, a look up table corresponds to a plurality of possible allocations, and an index to the look up table is utilized to indicate how basic resource units are allocated, in an embodiment.

Referring now to FIGS. 2-4, a bit map, a codebook entry, look up table index, etc., described above for indicating allocation of an individual communication channel is included in an RA indication field 304, which is included in a HE-SIGB field 252, in an embodiment. The bit map, codebook, look up table, etc., may correspond to allocation of resources in the same individual communication channel in which the bit map, codebook, look up table, etc., is transmitted, in some embodiments. In some embodiments, basic resource units in the individual communication channel may be part of an allocation that includes basic resource units in one or more individual communication channels. For example, in an embodiment, all basic resource units from two individual communication channels may be allocated as a single resource unit. As another example, in an embodiment, all basic resource units from four individual communication channels may be allocated as a single resource unit. As yet another example, in an embodiment, all basic resource units from eight individual communication channels may be allocated as a single resource unit. As still another example, in an embodiment, all basic resource units from sixteen individual communication channels may be allocated as a single resource unit.

Figure 5:
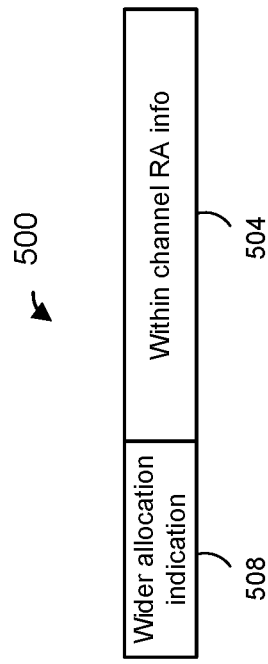
FIG. 5 is a diagram of an example information element that is included in a field 304 of the example information element of FIG. 3, according to an embodiment.

In some embodiments, the RA indication field 304 includes one or more bits that indicate whether the basic resource units in the individual communication channel to which the RA indication field 304 corresponds are part of a large allocation involving basic resource units from one or more other individual communication channels. FIG. 5 is a diagram of an example information element 500 that is included in the RA indication field 304, in some embodiments. The information element 500 includes an RA information subfield 504 that indicates basic resource unit allocation within the individual communication channel in which the information element 500 is transmitted, in an embodiment. In some embodiments, the RA information subfield 504 includes a bit map, a codebook entry, a look up table index, etc.

The information element 500 also includes a wider allocation indication subfield 508 that indicates whether basic resource units within the individual communication channel in which the information element 500 is transmitted are part of an allocation that includes basic resource units in other individual communication channels, in an embodiment.

In an embodiment, the wider allocation indication subfield 508 includes A bits, where A=ceil($\log_2$(K+1)), where K is a number of possible wider allocations. Referring to the example allocation scheme 400 of FIG. 4, if the only wider allocation corresponds to an allocation of 484 tones in a 40 MHz bandwidth, then K=1, and A=1. As another example, if there are two wider allocations (e.g., 484 tones in a 40 MHz bandwidth, and 968 tones in an 80 MHz bandwidth), then K=2, and A=2. As yet another example, if there are three wider allocations (e.g., 484 tones in a 40 MHz bandwidth, 968 tones in an 80 MHz bandwidth, and 1936 tones in a 160 MHz bandwidth), then K=3, and A=2. As another example, if there are four wider allocations (e.g., 484 tones in a 40 MHz bandwidth, 968 tones in an 80 MHz bandwidth, 1936 tones in a 160 MHz bandwidth, and 3872 tones in a 320 MHz bandwidth), then K=4, and A=3. Table 1 is an illustrative example in which the wider allocation indication subfield 508 includes three bits, according to an illustrative embodiment.

TABLE 1

| Bit Value | Interpretation |
| --- | --- |
| 000 | No wider allocation |
| 001 | 40 MHz-wide allocation |
| 010 | 80 MHz-wide allocation |
| 011 | 160 MHz-wide allocation |
| 100 | 320 MHz-wide allocation |
| 101 | Reserved |
| 110 | Reserved |
| 111 | Reserved |

Table 1 is merely an illustrative example of how to interpret three bits in the wider allocation indication subfield 508, and other suitable interpretations may be utilized in other embodiments. Similarly, in other embodiments, other suitable interpretations are utilized when the wider allocation indication subfield 508 includes a suitable number of bits other than three.

In some embodiments, when the wider allocation indication subfield 508 indicates a wider allocation, the subfield 504 is omitted. In some embodiments, when the wider allocation indication subfield 508 indicates a wider allocation, the subfield 504 is shortened as compared to when the allocation indication subfield 508 indicates no wider allocation. In some embodiments, when the wider allocation indication subfield 508 indicates a wider allocation, the subfield 504 is the same length as when the allocation indication subfield 508 indicates no wider allocation.

Referring again to FIG. 2, in some embodiments, the RA indication field 304 includes resource allocation information corresponding to an individual communication channel different than the individual communication channel in which the RA indication field 304 is transmitted. Thus, in some embodiments, the RA indication field 304 includes a subfield that indicates to which channel, within a plurality of individual communication channels, the RA indication field 304 corresponds.

Figure 6:
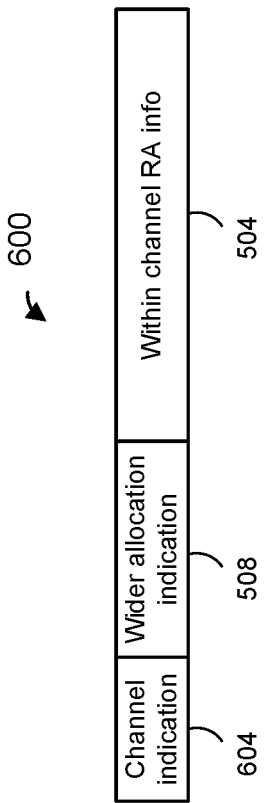
FIG. 6 is a diagram of an example information element that is included in the field 304 of the example information element of FIG. 3, according to another embodiment.

FIG. 6 is a diagram of an example information element 600 that is included in the RA indication field 304, in some embodiments. The information element 600 is similar to the information element 500 of FIG. 5, and like-numbered elements are not discussed in detail for purposes of brevity. The information element 600 includes a channel indication subfield 604 that indicates an individual communication channel to which the information 600 corresponds, in an embodiment.

In an embodiment, the channel indication subfield 604 includes a suitable number of bits that varies depending on the number of individual communication channels that are to be supported.

In examples described above, the RA indication field 304 includes a joint indication of multiple allocations to multiple resource units. In other embodiments, however, each allocated resource unit is indicated separately by a respective subfield within the RA indication field 304. For example, an allocation of a first resource unit is indicated by a first set of bits in the RA indication field 304, and an allocation of a second resource unit is indicated by a second set of bits in the RA indication field 304, according to an embodiment.

Figure 7:
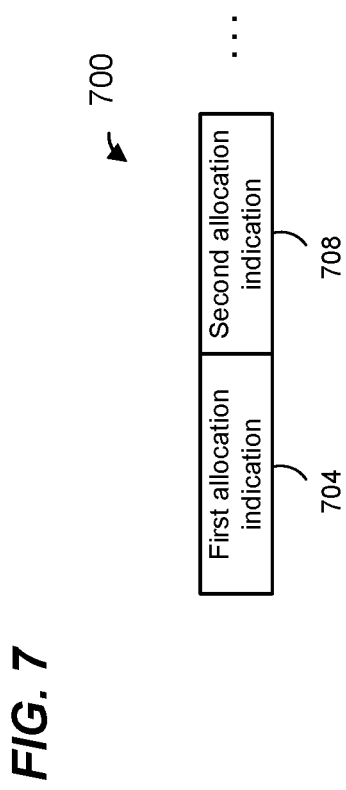
FIG. 7 is a diagram of example subfields that are included in a field of the example information element of FIG. 3, according to another embodiment.

FIG. 7 is a diagram of an example set 700 of individual allocation subfields that are included in the RA indication field 304, according to an embodiment. For instance, a first subfield 704 corresponds to a first allocation and a second subfield 708 corresponds to a second allocation. If more than two allocations are to be indicated, the set 700 includes one or more additional subfields.

In an embodiment, each resource unit allocation for a single individual communication channel in which 16 different allocations are possible is indicated by a subfield consisting of four bits. Referring to FIG. 7, for example, each subfield 704, 708, etc., consists of four bits, in an embodiment. In other embodiments, each subfield 704, 708, etc., consists of a suitable number of bits different than four. In an embodiment that utilizes the example allocation scheme 400 of FIG. 4, each resource unit allocation is indicated by each subfield 704, 708, etc., as specified by Table 2.

TABLE 2

| Bit Value of Subfield | Interpretation |
| --- | --- |
| 0000 | 404a |
| 0001 | 404b |
| 0010 | 404c |
| 0011 | 404d |
| 0100 | 404e |
| 0101 | 404f |
| 0110 | 404g |
| 0111 | 404h |
| 1000 | 404i |
| 1001 | 408a |
| 1010 | 408b |
| 1011 | 408c |
| 1100 | 408d |
| 1101 | 412a |
| 1110 | 412b |
| 1111 | 416 |

Table 2 is merely an illustrative example of how to interpret four bits in each subfield 704, 708, etc., and other suitable interpretations may be utilized in other embodiments. Similarly, in other embodiments, other suitable interpretations are utilized when each subfield 704, 708, etc., includes a suitable number of bits other than four.

The embodiment corresponding to Table 2 is suitable for situations in which the communication channel consists of a single individual communication channel. However, when the communication channel is an aggregate channel comprising multiple individual communication channels, each subfield 704, 708, etc., may require additional bits. For example, in an embodiment, when the communication channel is a 40 MHz-wide aggregate channel comprising two 20 MHz individual communication channel, each subfield 704, 708, etc., consists of at most six bits. For example, a first bit indicates whether the allocation corresponds to a 484-tone allocation that includes all of the basic resource units in both individual communication channels, in an embodiment. A second bit indicates whether the allocation corresponds to i) a first individual communication channel, or ii) a second individual communication channel, in an embodiment. Third through sixth bits are utilized to an allocation corresponding to one of i) the first individual communication channel, or ii) the second individual communication channel (as indicated by the second bit), in an embodiment. The third through sixth bits are specified the same as in Table 2, in an embodiment.

In an embodiment, when the first bit indicates a 484-tone allocation, the second through sixth bits are set to a predefined value. In another embodiment, when the first bit indicates a 484-tone allocation, the second through sixth bits are omitted.

As another example, in an embodiment, when the communication channel is an 80 MHz-wide aggregate channel comprising four 20 MHz individual communication channel, each subfield 704, 708, etc., consists of at most eight bits. For example, a first bit indicates whether the allocation corresponds to all of the basic resource units in both a first individual communication channel and a second individual communication channel (e.g., a first set of 484 tones), in an embodiment. A second bit indicates whether the allocation corresponds to all of the basic resource units in both a third individual communication channel and a fourth individual communication channel (e.g., a second set of 484 tones), in an embodiment.

In another embodiment, the first bit and the second bit are utilized to indicate whether the allocation is i) a 968-tone allocation corresponding to the first through fourth individual communication channels, ii) a 484-tone allocation corresponding to the first and second individual communication channels, or iii) a 484-tone allocation corresponding to the third and fourth individual communication channels.

In an embodiment, third and fourth bits are utilized to indicate whether the allocation corresponds to i) the first individual communication channel, ii) the second individual communication channel, iii) the third individual communication channel, or iv) the fourth individual communication channel, in an embodiment. Thus, in some embodiments, the third and fourth bits act as a channel indicator that indicates one of i) the first individual communication channel, ii) the second individual communication channel, iii) the third individual communication channel, or iv) the fourth individual communication channel. In an embodiment in which the subfield 704, 708 is transmitted in the same communication channel corresponding to the allocation, the third and fourth bits and one of the first and second bits are omitted. Thus, in an embodiment in which the subfield 704, 708 is transmitted in the same communication channel corresponding to the allocation, the subfield 704, 708 consists of at most four bits.

Fifth through eighth bits are utilized to an allocation corresponding to one of i) the first individual communication channel, ii) the second individual communication channel, iii) the third individual communication channel, or iv) the fourth individual communication channel (as indicated by the third and fourth bits (when included)), in an embodiment. The fifth through eighth bits are specified the same as in Table 2, in an embodiment.

In some embodiments, when the first bit indicates a first 484 tone allocation, the second through eighth bits are set to a predefined value or omitted. In another embodiment, when the first and second bits indicate a second 484 tone allocation, the third through eighth bits are set to a predefined value or omitted.

In some embodiments, when the first and second bits indicate a 968-tone allocation, the third through eighth bits are set to a predefined value or are omitted.

In another embodiment corresponding to an 80 MHz-wide composite channel, each subfield 704, 708, etc., consists of at most seven bits. In this embodiments, first through third bits are specified according to Table 3.

TABLE 3

| First through third bits | Interpretation |
| --- | --- |
| 000 | First set of 484 tones |
| 001 | Second set of 484 tones |
| 010 | First set of 242 tones |
| 011 | Second set of 242 tones |
| 100 | Third set of 242 tones |
| 101 | Fourth set of 242 tones |
| 110 | Reserved |
| 111 | Reserved |

Table 3 is merely an illustrative example of how to interpret the first through third bits in each subfield 704, 708, etc., and other suitable interpretations may be utilized in other embodiments. Similarly, in other embodiments, other suitable interpretations are utilized when each subfield 704, 708, etc., includes a suitable number of bits other than four. In some embodiments, the first through third bits can also be utilized to indicate a 968-tone allocation.

In an embodiment, fourth through seventh bits are utilized to indicate within an individual communication channel. The fourth through seventh bits are specified the same as in Table 2, in an embodiment.

In an embodiment, when the first through third bits indicate a 484 tone allocation, the fourth through seventh bits are set to a predefined value. In another embodiment, when the first through third bits indicate a 484 tone allocation, the fourth through seventh bits are omitted.

As another example, in an embodiment, when the communication channel is a 160 MHz-wide aggregate channel comprising eight 20 MHz individual communication channel, each subfield 704, 708, etc., consists of at most twelve bits. For example, first through fourth bits indicate whether the allocation corresponds to i) all of the basic resource units in both a first individual communication channel and a second individual communication channel (e.g., a first set of 484 tones), ii) all of the basic resource units in both a third individual communication channel and a fourth individual communication channel (e.g., a second set of 484 tones), iii) all of the basic resource units in both a fifth individual communication channel and a sixth individual communication channel (e.g., a third set of 484 tones), of iv) all of the basic resource units in both a seventh individual communication channel and an eighth individual communication channel (e.g., a fourth set of 484 tones), in an embodiment.

In another embodiment, the first through fourth bits are utilized to indicate whether the allocation is i) a 968-tone allocation corresponding to the first through fourth individual communication channels, or ii) a 968-tone allocation corresponding to the fifth through eighth individual communication channels. In another embodiment, the first through fourth bits are utilized to indicate whether the allocation is a 1936-tone allocation corresponding to the first through eighth individual communication channels.

In an embodiment, fifth through eighth bits are utilized to indicate whether the allocation corresponds to i) the first individual communication channel, ii) the second individual communication channel, iii) the third individual communication channel, iv) the fourth individual communication channel, v) the fifth individual communication channel, vi) the sixth individual communication channel, vii) the seventh individual communication channel, or viii) the eighth individual communication channel, in an embodiment. Thus, in some embodiments, the fifth through eighth bits act as a channel indicator. In an embodiment in which the subfield 704, 708 is transmitted in the same communication channel corresponding to the allocation, the fifth through eighth bits and three of the first through fourth bits are omitted. Thus, in an embodiment in which the subfield 704, 708 is transmitted in the same communication channel corresponding to the allocation, the subfield 704, 708 consists of at most five bits.

Ninth through twelfth bits are utilized to indicate an allocation corresponding to one of first through eighth individual communication channel (as indicated by the fifth through eighth bits (when included)), in an embodiment. The ninth through twelfth bits are specified the same as in Table 2, in an embodiment.

In some embodiments, when the first bit indicates a first 484 tone allocation, the second through twelfth bits are set to a predefined value or omitted. In an embodiment, when the first and second bits indicate a second 484 tone allocation, the third through twelfth bits are set to a predefined value or omitted. In an embodiment, when the first through third bits indicate a third 484 tone allocation, the fourth through twelfth bits are set to a predefined value or omitted. In an embodiment, when the first through fourth bits indicate a fourth 484 tone allocation, the fifth through twelfth bits are set to a predefined value or omitted.

In some embodiments, when the first and second bits indicate a 968-tone allocation, the third through twelfth bits are set to a predefined value or are omitted. In some embodiments, when the first through fourth bits indicate a 968-tone allocation or larger, the fifth through twelfth bits are set to a predefined value or are omitted.

In another embodiment corresponding to a 160 MHz-wide composite channel, each subfield 704, 708, etc., consists of at most eight bits. In this embodiment, first through fourth bits are specified according to Table 4.

TABLE 4

| First through fourth bits | Interpretation |
|---|---|
| 0000 | First set of 484 tones |
| 0001 | Second set of 484 tones |
| 0010 | Third set of 484 tones |
| 0011 | Fourth set of 484 tones |
| 0100 | First set of 242 tones |
| 0101 | Second set of 242 tones |
| 0110 | Third set of 242 tones |

TABLE 4-continued

| First through fourth bits | Interpretation |
|---|---|
| 0111 | Fourth set of 242 tones |
| 1000 | Fifth set of 242 tones |
| 1001 | Sixth set of 242 tones |
| 1010 | Seventh set of 242 tones |
| 1011 | Eighth set of 242 tones |
| 1100-1111 | Reserved |

Table 4 is merely an illustrative example of how to interpret the first through fourth bits in each subfield 704, 708, etc., and other suitable interpretations may be utilized in other embodiments. Similarly, in other embodiments, other suitable interpretations are utilized when each subfield 704, 708, etc., includes a suitable number of bits other than eight. In some embodiments, the first through fourth bits can also be utilized to indicate a 968-tone allocation. In some embodiments, the first through fourth bits can also be utilized to indicate a 1936-tone allocation.

In an embodiment, fifth through eighth bits are utilized to indicate within an individual communication channel. The fifth through eighth bits are specified the same as in Table 2, in an embodiment.

In an embodiment, when the first through fourth bits indicate a 484 tone allocation or larger, the fifth through eighth bits are set to a predefined value. In another embodiment, when the first through fourth bits indicate a 484 tone allocation or larger, the fifth through eighth bits are omitted.

The various RA information subfields and RA configuration subfields described herein are encoded jointly, individually, or in blocks, in various embodiments. FIGS. 8A-8D are diagrams that illustrate different methods of encoding RA information subfields and RA configuration subfields, according to some embodiments.

Figure 8A:
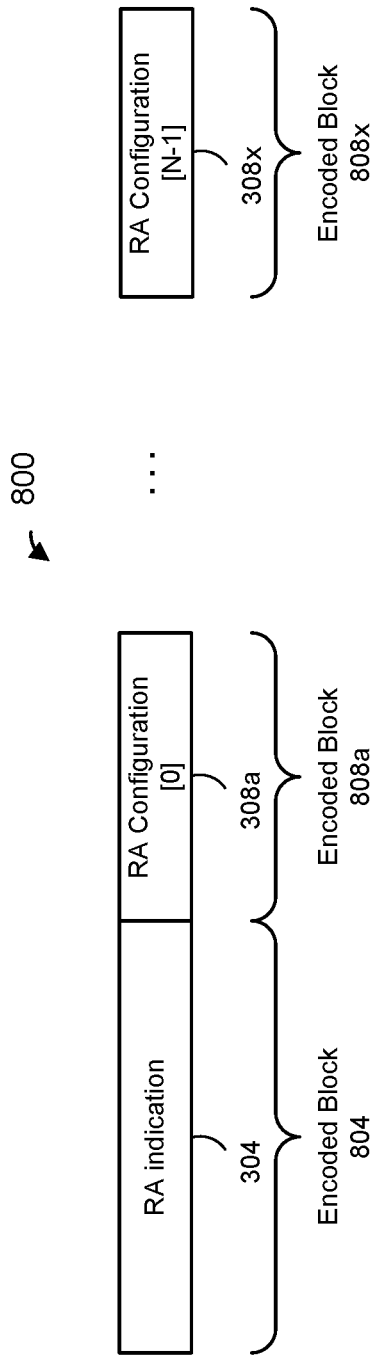
FIGS. 8A-D are diagrams of example error correction encoding techniques for encoding the example information element of FIG. 3, according to various embodiments.

For instance, FIG. 8A is a diagram of an example encoding 800 of the example information element 300 discussed above in connection with FIG. 3. The RA indication subfield 304 encoded as a block 804, and each of the RA configuration subfields 308 is each encoded as a separate block 808, in the illustrated embodiment. The channel specific common subfield RA indication subfield 304 and the RA configuration subfields 308 are encoded using binary convolutional coding (BCC) encoding, in an embodiment. Although not shown in FIG. 8A, the encoded blocks 804, 808 include respective CRC bits and respective tail bits, in an embodiment. In another embodiment, the RA indication subfield 304 and the RA configuration subfields 308 are encoded using tail biting convolutional coding (TBCC). In some embodiments using TBCC, the encoded blocks 804, 808 omit tail bits.

Figure 8B:
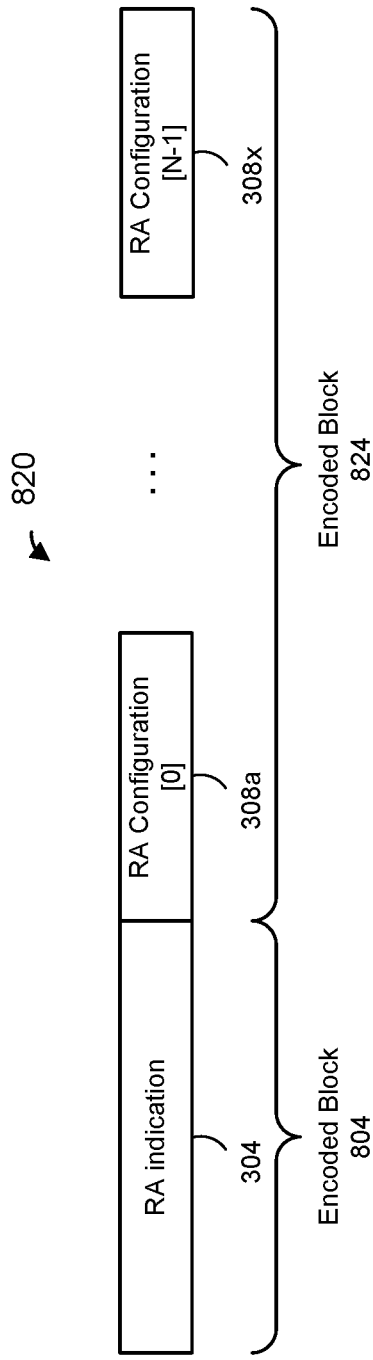

FIG. 8B is a diagram of an example encoding 820, in which the RA indication subfield 304 is encoded as the block 804, and all of the RA configuration subfields 308 are encoded as a single block 824, in the illustrated embodiment. The RA indication subfield 304 and the RA configuration subfields 308 are encoded using BCC encoding, in an embodiment. Although not shown in FIG. 8B, the encoded blocks 804, 824 include respective CRC bits and respective tail bits, in an embodiment. In another embodiment, the RA indication subfield 304 and the RA configuration subfields 308 are encoded using TBCC encoding. In some embodiments using TBCC, the encoded blocks 804, 824 omit tail bits.

Figure 8C:
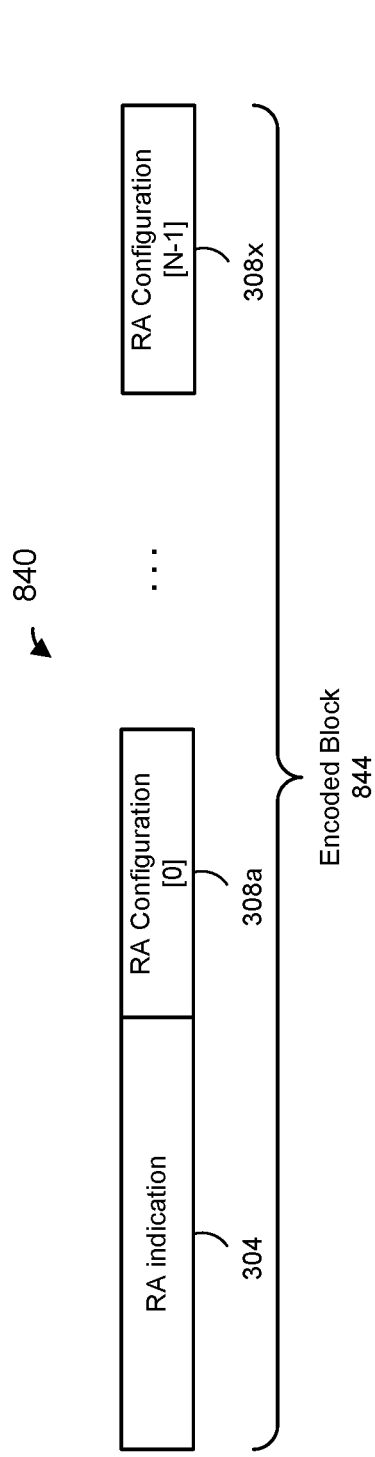

FIG. 8C is a diagram of an example encoding 840 in which the RA indication subfield 304 and all of the RA configuration subfields 308 are encoded as a single block 844, in the illustrated embodiment. The RA indication subfield 304 and the RA configuration subfields 308 are encoded using BCC encoding, in an embodiment. Although not shown in FIG. 8B, the encoded block 844 includes CRC bits and tail bits, in an embodiment. In another embodiment, the RA indication subfield 304 and the RA configuration subfields 308 are encoded using TBCC encoding. In some embodiments using TBCC, the encoded block 844 omits tail bits.

Figure 8D:
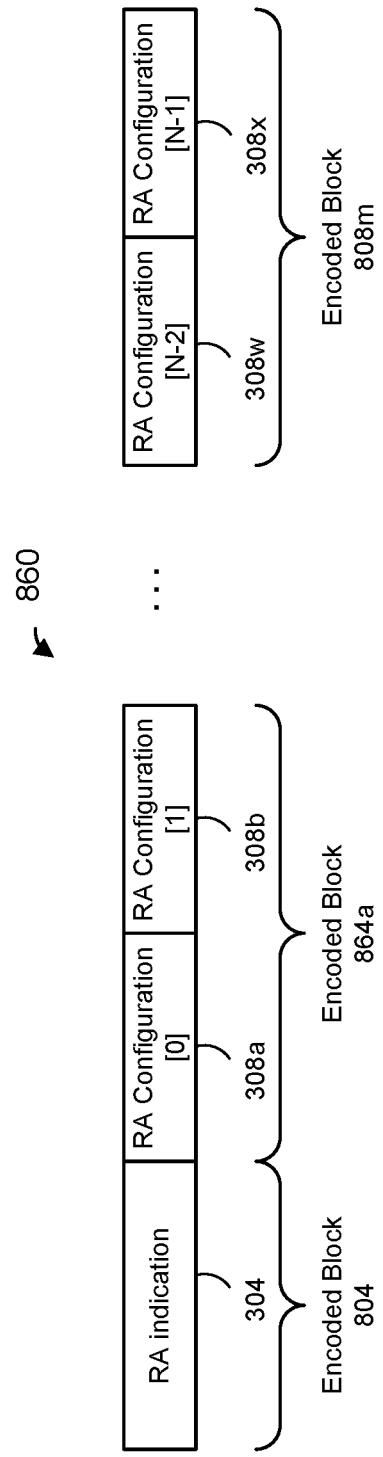

FIG. 8D is a diagram of an example encoding 860 in which the RA indication subfield 304 is encoded as the block 804, and groups of RA configuration subfields 308 are encoded as respective blocks 864, in the illustrated embodiment. The RA indication subfield 304 and the RA configuration subfields 308 are encoded using BCC encoding, in an embodiment. Although not shown in FIG. 8D, the encoded blocks 804, 864 include respective CRC bits and respective tail bits, in an embodiment. In another embodiment, the RA indication subfield 304 and the RA configuration subfields 308 are encoded using TBCC encoding. In some embodiments using TBCC, the encoded blocks 804, 864 omit tail bits.

In an embodiment, each group of K RA configuration subfields 308 is encoded as a separate block 864, wherein K is a positive integer. In an embodiment, if the number N of RA configuration subfields 308 is not divisible by the number K of RA configuration subfields 308 per coding group, the last L RA configuration subfields 308 are encoded as a separate block 808m, wherein L is a positive integer and wherein L<K. In the embodiment of FIG. 8D, K is equal to 2 and L is equal to 0. Accordingly, each group of two RA configuration subfields 308 is encoded as a separate block 808, in the illustrated embodiment.

Referring to FIGS. 8A, 8B, and 8D, in some embodiments, the RA indication subfield 304 is encoded as a single encoding block 804. As discussed above, in some embodiments, each allocated resource unit is indicated separately by a respective subfield within the RA indication field 304. Referring to FIG. 7, for example, an allocation of a first resource unit is indicated by a first subfield 704 in the RA indication field 304, and an allocation of a second resource unit is indicated by a second subfield 708 in the RA indication field 304, according to an embodiment. If more than two allocations are to be indicated, the set 700 includes one or more additional subfields, in some embodiments.

Figure 9A:
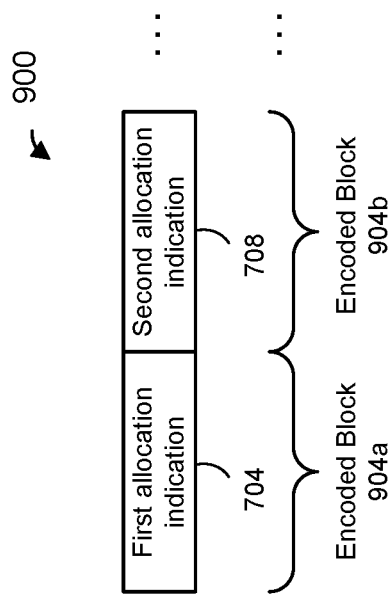
FIGS. 9A-B are diagrams of example error correction encoding techniques for encoding the example subfields of FIG. 73, according to various embodiments.

In embodiments in which the each allocated resource unit is indicated separately by a respective subfield within the RA indication field 304, each subfield within the RA indication field 304 is encoded separately. For example, FIG. 9A is a diagram of an example encoding 900 of the example RA indication field 304 discussed above in connection with FIGS. 3 and 7, according to an embodiment. Each of the subfields 704, 708, etc., is encoded as a respective block 904, in the illustrated embodiment. The subfields 704, 708, etc., are encoded using BCC encoding, in an embodiment. Although not shown in FIG. 9A, the encoded blocks 904 include respective CRC bits and respective tail bits, in an embodiment. In another embodiment, the subfields 704, 708, etc., are encoded using TBCC encoding. In some embodiments using TBCC, the encoded blocks 904 omit tail bits.

Figure 9B:
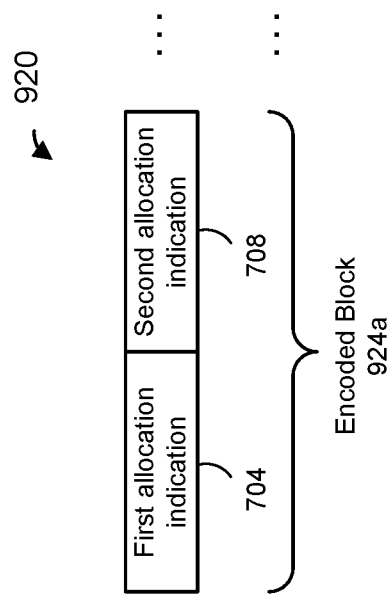

FIG. 9B is an example encoding 920 of the example RA indication field 304 discussed above in connection with FIGS. 3 and 7, according to an embodiment. In an embodiment, each group of K subfields 704, 708, etc., is encoded as a separate block 924, wherein K is a positive integer. In an embodiment, if the number N of 704, 708, etc., is not divisible by the number K of subfields 704, 708, etc., per coding group, the last L subfields 704, 708, etc., in the RA indicator field 304 are encoded as a separate block, wherein L is a positive integer and wherein L<K. In the embodiment of FIG. 9B, K is equal to 2 and L is equal to 0. Accordingly, each group of two subfields 704, 708, etc., is encoded as a separate block 924, in the illustrated embodiment.

The subfields 704, 708, etc., are encoded using BCC encoding, in an embodiment. Although not shown in FIG. 9B, the encoded blocks 924 include respective CRC bits and respective tail bits, in an embodiment. In another embodiment, the subfields 704, 708, etc., are encoded using TBCC encoding. In some embodiments using TBCC, the encoded blocks 924 omit tail bits.

FIG. 10 is a flow diagram of an example method 1000 for generating a MU PHY data unit, according to an embodiment. With reference to FIG. 1, the method 1000 is implemented by the network interface device 16, in an embodiment. For example, in one such embodiment, the PHY processing unit 20 is configured to implement at least a portion of the method 1000. According to another embodiment, the MAC processing 18 is also configured to implement at least a portion of the method 1000. With continued reference to FIG. 1, in yet another embodiment, the method 1000 is implemented by the network interface device 27 (e.g., the PHY processing unit 29 and/or the MAC processing unit 28). In other embodiments, the method 1000 is implemented by other suitable network interface devices.

At block 1004, a PHY preamble of a MU PHY data unit is generated to include formatting information regarding the MU PHY data unit. In an embodiment, block 1004 includes generating a field of the PHY preamble to be transmitted within a first individual communication channel among the plurality of individual communication channels that collectively span a bandwidth of a composite communication channel. In an embodiment, each individual communication channel includes a plurality of basic RA units that collectively span a bandwidth of the individual communication channel.

In an embodiment, the field is generated at block 1004 to indicate one or more groupings of basic RA units, wherein at least one of the one or more groupings of basic RA units includes basic RA units of one or more other individual communication channels.

In various embodiments, the field generated at block 1004 is generated according to various methods for generating the RA indicator field 304 as discussed above with respect to one or more of FIGS. 3-7, 8A-D, and 9A-B.

At block 1008, a PHY data portion of the MU PHY data unit is generated according to the formatting information in the PHY preamble.

At block 1012, the MU PHY data unit is generated to include the PHY preamble generated at block 1004 and the PHY data portion generated at block 1008.

At block 1016, the MU PHY data unit generated at block 1012 is transmitted via the composite communication channel. In some embodiments, a first portion of the network interface device implements blocks 1004, 1008, and 1012, and a second portion of the network interface device implements block 1016. For example, block 1016 is implemented by transceivers 21, in an embodiment, whereas other portions of the network interface device 16 implements blocks 1004, 1008, and 1012.

In an embodiment, a method corresponds to generating multi-user (MU) physical layer (PHY) data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel. The method includes: generating, at a communication device, a PHY preamble that includes formatting information regarding the MU PHY data unit, including generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels; generating, at the communication device, a data portion of the MU PHY data unit according to the formatting information in the PHY preamble; and generating, at the communication device, the MU PHY data unit to include the PHY preamble and the data portion.

In other embodiments, the method includes one of, or any suitable combination of two or more of, the following features.

Generating the field that indicates the one or more groupings of basic RA units comprises: generating, at the communication device, a bitmap that indicates the one or more groupings of basic RA units; and including the bitmap in the field.

Generating the field that indicates the one or more groupings of basic RA units comprises: selecting, at the communication device, a codebook entry from a codebook that includes a plurality of codebook entries indicating a plurality of different groupings of basic RA units; and including the selected codebook entry in the field.

Generating the field that indicates the one or more groupings of basic RA units comprises: selecting, at the communication device, an index to a look up table that includes a plurality of entries indicating a plurality of different groupings of basic RA units; and including the selected index in the field.

Generating the field that indicates the one or more groupings of basic RA units comprises: generating, at the communication device, a plurality of subfields to indicate a plurality of respective groupings of basic RA units.

The method further includes: separately encoding, at the communication device, each subfield in the plurality of subfields according to an error correcting code to generate a respective encoding block that corresponds to the subfield.

The method further includes: encoding, at the communication device, multiple subfields in the plurality of subfields according to an error correcting code to generate an encoding block that corresponds to the multiple subfields.

Generating the plurality of subfields comprises: generating a first subfield to include an indicator that a first grouping corresponds to a grouping that includes i) all of basic RA units in the first individual communication channel, and ii) all of the basic RA units in one or more other individual communication channels.

Allowed groupings of basic RA units include multiple different groupings of all basic RA units of two or more individual communication channels; and generating the plurality of subfields comprises generating a first subfield to include an indicator of which one of the multiple different groupings of all basic RA units of two or more individual communication channels.

Generating the plurality of subfields comprises: generating a first subfield to include an indicator of one of the individual communication channels to which a first grouping corresponds.

In another embodiment, an apparatus comprises: a network interface device having one or more integrated circuits configured to generate a physical layer (PHY) preamble of a multi-user (MU) PHY data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel. The PHY preamble is generated to include formatting information regarding the MU PHY data unit, including: generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels. The one or more integrated circuits are further configured to: generate a data portion of the MU PHY data unit according to the formatting information in the PHY preamble, and generate the MU PHY data unit to include the PHY preamble and the data portion.

In other embodiments, the apparatus includes one of, or any suitable combination of two or more of, the following features.

The one or more integrated circuits are configured to: generate a bitmap that indicates the one or more groupings of basic RA units; and include the bitmap in the field that indicates the one or more groupings of basic RA units.

The one or more integrated circuits are configured to: select a codebook entry from a codebook that includes a plurality of codebook entries indicating a plurality of different groupings of basic RA units; and include the selected codebook entry in the field that indicates the one or more groupings of basic RA units.

The one or more integrated circuits are configured to: select an index to a look up table that includes a plurality of entries indicating a plurality of different groupings of basic RA units; and include the selected index in the field that indicates the one or more groupings of basic RA units.

The one or more integrated circuits are configured to generate the field to include a plurality of subfields to indicate a plurality of respective groupings of basic RA units.

The one or more integrated circuits are configured to: separately encode each subfield in the plurality of subfields according to an error correcting code to generate a respective encoding block that corresponds to the subfield.

The one or more integrated circuits are configured to: encode multiple subfields in the plurality of subfields according to an error correcting code to generate an encoding block that corresponds to the multiple subfields.

The one or more integrated circuits are configured to: generate a first subfield of the field to include an indicator that a first grouping corresponds to a grouping that includes i) all of basic RA units in the first individual communication channel, and ii) all of the basic RA units in one or more other individual communication channels.

Allowed groupings of basic RA units include multiple different groupings of all basic RA units of two or more individual communication channels; and the one or more integrated circuits are configured to: generate a first subfield of the field to include an indicator of which one of the multiple different groupings of all basic RA units of two or more individual communication channels.

The one or more integrated circuits are configured to: generate a first subfield of the field to include an indicator of one of the individual communication channels to which a first grouping corresponds.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable medium, or media, such as a magnetic disk, an optical disk, a random access memory (RAM), a read only memory (ROM), a flash memory, a memory of a processor, a tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating multi-user (MU) physical layer (PHY) data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel, the method comprising:
generating, at a communication device, a PHY preamble that includes formatting information regarding the MU PHY data unit, including generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels, wherein allowed groupings of basic RA units include multiple different groupings of all basic RA units of two or more individual communication channels, and wherein generating the field that indicates the one or more groupings of basic RA units comprises:
generating a plurality of subfields to indicate a plurality of respective groupings of basic RA units, including generating a first subfield to include an indicator of which one of the multiple different groupings of all basic RA units of two or more individual communication channels;
generating, at the communication device, a data portion of the MU PHY data unit according to the formatting information in the PHY preamble; and
generating, at the communication device, the MU PHY data unit to include the PHY preamble and the data portion.

2. The method of claim 1, wherein generating the field that indicates the one or more groupings of basic RA units comprises:
generating, at the communication device, a bitmap that indicates the one or more groupings of basic RA units; and
including the bitmap in the field.

3. The method of claim 1, wherein generating the field that indicates the one or more groupings of basic RA units comprises:
selecting, at the communication device, a codebook entry from a codebook that includes a plurality of codebook entries indicating a plurality of different groupings of basic RA units; and
including the selected codebook entry in the field.

4. The method of claim 1, wherein generating the field that indicates the one or more groupings of basic RA units comprises:
selecting, at the communication device, an index to a look up table that includes a plurality of entries indicating a plurality of different groupings of basic RA units; and
including the selected index in the field.

5. The method of claim 1, further comprising:
separately encoding, at the communication device, each subfield in the plurality of subfields according to an error correcting code to generate a respective encoding block that corresponds to the subfield.

6. The method of claim 1, further comprising:
encoding, at the communication device, multiple subfields in the plurality of subfields according to an error correcting code to generate an encoding block that corresponds to the multiple subfields.

7. The method of claim 1, wherein the multiple different groupings include:
a first grouping that includes i) all of basic RA units in the first individual communication channel, and ii) all of the basic RA units in one or more other individual communication channels.

8. The method of claim 1, wherein generating the plurality of subfields comprises:
generating a second subfield to include an indicator of one of the individual communication channels to which a first grouping corresponds.

9. An apparatus, comprising:
a network interface device having one or more integrated circuits configured to:
generate a physical layer (PHY) preamble of a multi-user (MU) PHY data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel, and wherein the PHY preamble is generated to include formatting information regarding the MU PHY data unit, including generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels, wherein allowed groupings of basic RA units include multiple different groupings of all basic RA units of two or more individual communication channels, and wherein generating the field that indicates the one or more groupings of basic RA units comprises:

generating a plurality of subfields to indicate a plurality of respective groupings of basic RA units, including generating a first subfield to include an indicator of which one of the multiple different groupings of all basic RA units of two or more individual communication channels;

wherein the one or more integrated circuits are further configured to:

generate a data portion of the MU PHY data unit according to the formatting information in the PHY preamble, and generate the MU PHY data unit to include the PHY preamble and the data portion.

10. The apparatus of claim 9, wherein the one or more integrated circuits are configured to:

generate a bitmap that indicates the one or more groupings of basic RA units; and include the bitmap in the field that indicates the one or more groupings of basic RA units.

11. The apparatus of claim 9, wherein the one or more integrated circuits are configured to:

select a codebook entry from a codebook that includes a plurality of codebook entries indicating a plurality of different groupings of basic RA units; and include the selected codebook entry in the field that indicates the one or more groupings of basic RA units.

12. The apparatus of claim 9, wherein the one or more integrated circuits are configured to:

select an index to a look up table that includes a plurality of entries indicating a plurality of different groupings of basic RA units; and include the selected index in the field that indicates the one or more groupings of basic RA units.

13. The apparatus of claim 9, wherein the one or more integrated circuits are configured to:

separately encode each subfield in the plurality of subfields according to an error correcting code to generate a respective encoding block that corresponds to the subfield.

14. The apparatus of 9, wherein the one or more integrated circuits are configured to:

encode multiple subfields in the plurality of subfields according to an error correcting code to generate an encoding block that corresponds to the multiple subfields.

15. The apparatus of claim 9, wherein the multiple different groupings include:

a first grouping that includes i) all of basic RA units in the first individual communication channel, and ii) all of the basic RA units in one or more other individual communication channels.

16. The apparatus of claim 9, wherein the one or more integrated circuits are configured to:

generate a second subfield of the field to include an indicator of one of the individual communication channels to which a first grouping corresponds.

17. A method for generating multi-user (MU) physical layer (PHY) data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel, the method comprising:

generating, at a communication device, a PHY preamble that includes formatting information regarding the MU PHY data unit, including generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels, wherein generating the field that indicates the one or more groupings of basic RA units comprises:

generating a plurality of subfields to indicate a plurality of respective groupings of basic RA units, including generating a first subfield to include an indicator that a first grouping corresponds to a grouping that includes i) all of basic RA units in the first individual communication channel, and ii) all of the basic RA units in one or more other individual communication channels;

generating, at the communication device, a data portion of the MU PHY data unit according to the formatting information in the PHY preamble; and generating, at the communication device, the MU PHY data unit to include the PHY preamble and the data portion.

18. An apparatus, comprising:

a network interface device having one or more integrated circuits configured to:

generate a physical layer (PHY) preamble of a multi-user (MU) PHY data unit for transmission via a composite communication channel that comprises a plurality of individual communication channels that collectively span a bandwidth of the composite communication channel, wherein each individual communication channel includes a plurality of basic resource allocation (RA) units that collectively span a bandwidth of the individual communication channel, and wherein the PHY preamble is generated to include formatting information regarding the MU PHY data unit, including generating a field of the PHY preamble to be transmitted within a first individual communication channel among the plurality of individual communication channels, wherein the field is generated to indicate one or more groupings of basic RA units, wherein at least one of the one or more groupings of basic RA units includes basic RA units of one or more other individual communication channels, wherein generating the field that indicates the one or more groupings of basic RA units comprises:

generating a plurality of subfields to indicate a plurality of respective groupings of basic RA units, including generating a first subfield to include an indicator that a first grouping corresponds to a grouping that includes i) all of basic RA units in the first individual communication channel, and ii) all of the basic RA units in one or more other individual communication channels;

wherein the one or more integrated circuits are further configured to:
  generate a data portion of the MU PHY data unit according to the formatting information in the PHY preamble, and
  generate the MU PHY data unit to include the PHY preamble and the data portion.

* * * * *